March 14, 1972        E. P. MILLER        3,649,408

METHOD OF APPLYING FIBER-LIKE ADHESIVE TO A SUBSTRATE

Filed Aug. 15, 1969        2 Sheets-Sheet 1

INVENTOR
EMERY P. MILLER

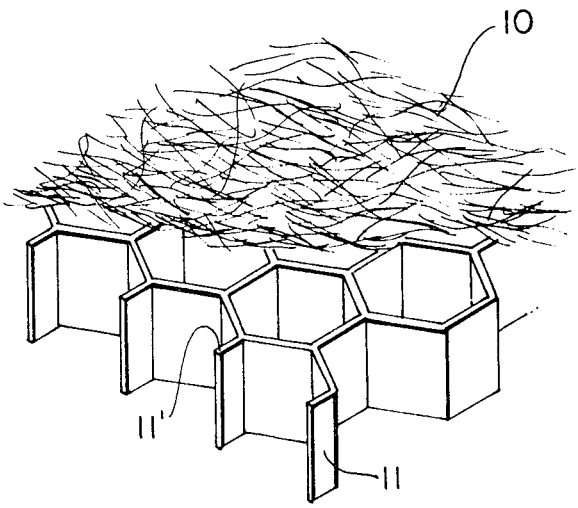
Fig. 2
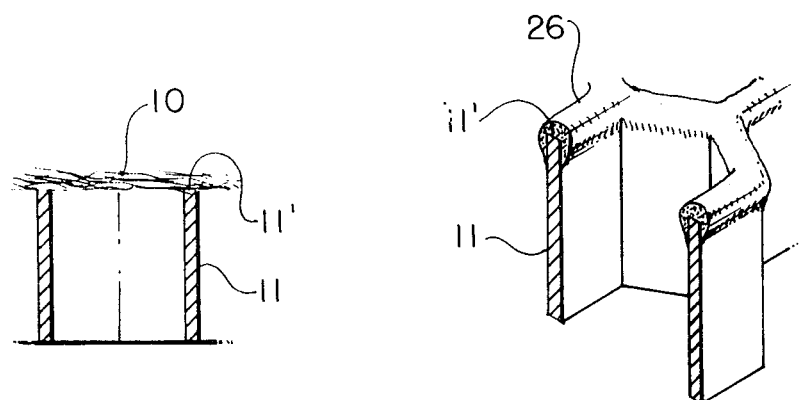
Fig. 3
Fig. 4
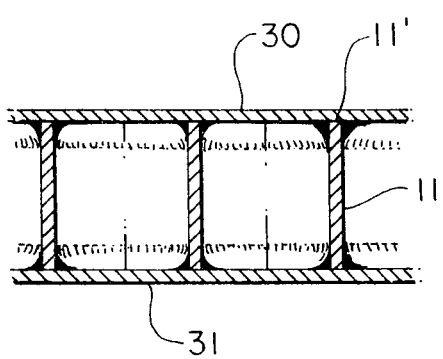
Fig. 5
INVENTOR
EMERY P. MILLER

United States Patent Office 3,649,408
Patented Mar. 14, 1972

3,649,408
METHOD OF APPLYING FIBER-LIKE ADHESIVE TO A SUBSTRATE
Emery P. Miller, Indianapolis, Ind., assignor to Ransburg Electro-Coating Corp., Indianapolis, Ind.
Filed Aug. 15, 1969, Ser. No. 850,596
Int. Cl. B05b 5/00; C09j 5/06
U.S. Cl. 156—272
11 Claims

ABSTRACT OF THE DISCLOSURE

A method for forming and causing deposition of fiber-like lengths of an adhesive substance upon a side of an apertured substrate. The method includes the steps of forming and propelling fiber-like lengths of the adhesive substance toward the side of the apertured substrate. Substantially all of the fiber-like lengths of the adhesive substance are deposited on the side of the substrate in a jackstraw fashion. The fiber-like lengths of adhesive substance deposited on the side of the substrate may be treated at an elevated temperature. During heat treatment of the fiber-like lengths of adhesive substance at the elevated temperature, the adhesive substance melts and due to its surface tension tends to accumulate about the edges of the apertures of the apertured substrate as a substantially continuous mass. If desired, the opposite side of the substrate may also have the adhesive substance applied thereto in the same manner.

A sheet material may be placed contiguous to the side of the apertured substrate carrying the adhesive substance. The application of heat and/or pressure to the contiguous substrate and sheet material tends to cause the adhesive substance carried by the substrate to form a fillet-like mass which generally extends between the sheet material and the apertured substrate. The fillet of the adhesive substance joins the sheet material to the apertured substrate to provide sandwich structure.

---

The present invention relates to a method of providing a composite or sandwich structure which includes an adhesive carrying apertured substrate and particularly to a method for depositing lengths of a fiber-like adhesive substance on a side of the apertured substrate material. More particularly, the present invention relates to a method for forming and depositing fiber-like lengths of the adhesive substance in a jackstraw fashion upon the edged surface of a plurality of cells which cooperate to provide the apertured substrate material. A suitable sheet material may be joined to the substrate material by the adhesive substance to thereby provide the sandwich structure. A method for providing the sandwich structure includes placing a jackstraw assembly of fibrous adhesive on the side of the apertured substrate in the form of an open discontinuous layer, heating the layered material to about its melting point so that it will contract on the edges of the substrate, placing a sheet material in contact with the substrate and then joining the sheet material and the substrate together by application of heat and pressure.

Joining of an apertured substrate material to a facing material to provide a sandwich structure of superposed layers of materials may be done in an attempt to maximize desirable individual physical properties of each of the several layers of material and to minimize the less desirable physical properties of the individual layers of material. The joining together of the individual layers of materials may be accomplished by various different joining techniques such as by bolting, riveting, soldering, brazing and the like. However, in situations where the weight of the resultant sandwich structure should be minimized, it does not appear to be practical to join together the layers of material by bolting, riveting, soldering, brazing and the like because of the additional weight introduced into the sandwich structure by such joining techniques.

In order to reduce the weight of the sandwich structure provided by bolting, soldering and the like, the layers of material may be joined or bonded together by a lightweight material such as a suitable adhesive substance. In applications where weight and strength of sandwich structures are characteristics to be desired, such as in aircraft industry, adhesive joined sandwich structures have a wide application. A typical sandwich construction used in the aircraft industry includes a honeycomb substrate having a myriad of honeycomb-like cells and a sheet material joined to one or both extremities of the cells of the substrate by the adhesive substance. The honeycomb substrate faced with sheet material possesses a high strength-to-weight ratio. The strength of the sandwich construction may be traced to the honeycomb substrate which may be considered to be analogous to an I-beam in which the honeycomb substrate is expanded until it is about the same as the width of the sheet material on either side of the honeycomb substrate.

A metal honeycomb substrate having an adhesively joined metal sheet material on each surface may be used in cabin decks, bulkheads, wing and tail trailing edges, doors, control and access panels, and the like for aircraft and for partition panels for modular office construction and the like. A metallic or non-metallic honeycomb substrate having non-metallic facings such as glass, wood, plastic, polystyrene foam, polyurethane foam, wall board and the like may be used as doors, partitions, furniture tops and the like.

Generally, any structural adhesive suitable for joining metal-to-metal, metal-to-non-metal or non-metal-to-non-metal may be used to join together the layers of material of the sandwich construction. The form of the structural adhesive as applied may be paste, powder, film, liquid and the like. Usually, the structural adhesive is uniformly applied to the face of the sheet material to be joined to the side of the honeycomb substrate by any suitable technique such as by brushing, rolling, dusting, troweling and the like. In addition, the liquid type of structural adhesive may be atomized, entrained in air and deposited upon the sheet material.

Joining of the sheet material to the honeycomb substrate to provide a sandwich structure may be accomplished by contacting the edge of the substrate with the face of the sheet material carrying the adhesive substance and subjecting the contacted surfaces to heat and/or pressure.

The above techniques of depositing the structural adhesive onto the sheet material may result in a substantially continuous layer of adhesive substance extending between the spaced apart side walls of many of the honeycomb cells. In some instances, the thickness of the layer of structural adhesive substance extending between the spaced apart side walls of a honeycomb cell may be greater than the thickness of the sheet material joined to the honeycomb substrate. The portion of the adhesive substance which extends between adjacent side walls of the cell appears to add little, if anything, to the strength of the joint between the side of the honeycomb substrate and the sheet material. Therefore, it would appear that this portion of the adhesive substance adds only undesirable weight to the sandwich construction. To minimize the weight problem, it would be desirable to have the adhesive located only at the point of contact between the substrate edge and the sheet material. It would appear to be desirable to apply the adhesive, therefore, to the substrate edge rather than to the sheet material. The adhesive substantially confined to the edges of the honeycomb substrate should be available in sufficient quantity so as to form a fillet of adhesive between the honeycomb structure edge and the sheet material and not be available on other areas where it adds little, if anything, to the bond strength.

Fluidized beds using electrostatic deposition techniques may be used as a means for depositing powdered structural adhesive upon the side of the honeycomb substrate. Structural adhesive powder deposited upon the side of the honeycomb substrate by an electrostatic fluidized bed appears to provide a suitable deposit of the adhesive powder; however, accumulations of the adhesive powder may also be found on the side walls of several of the cells which form the honeycomb substrate. The adhesive powder on the side walls of the cells of the honeycomb substrate does not appear to assist in providing a joint between adjacent surfaces of the sandwich structure and, therefore, the powder on the sidewalls appears to add undesirable weight to the sandwich structure. It is thought that the use of an electrostatic fluidized bed to deposit the adhesive powder upon the side of the honeycomb substrate or upon the face of the sheet material does not provide a significant reduction in weight of the sandwich structure over the prior art methods of brushing, rolling, dusting, troweling and the like.

Therefore, it is an object of the present invention to provide a method for overcoming the above-mentioned problems.

A further object of the present invention is to provide a method including the steps of providing fiber-like lengths of an adhesive substance and depositing the lengths upon the side of an aperture substrate.

Another object of the present invention is to provide a method for depositing fiber-like lengths of an adhesive substance upon the side of an aperture substrate in a jackstraw fashion.

Yet another object of the present invention is to provide a method for providing an aluminum or aluminum alloy-structural adhesive-aluminum or aluminum alloy sandwich structure.

A further object of the present invention is to provide a method for forming a metallic or non-metallic-structural adhesive-metallic or non-metallic joint.

A further object of the present invention is to provide a method of adhesive application to cellular substrates used in composite structure formations in which the adhesive is substantially confined to the linear contact portions of the substrate and the sheet material.

Another object of the present invention is to provide an apparatus capable of forming electrically charged fiber-like lengths of an adhesive substance and depositing them in a jackstraw fashion upon the side of a honeycomb substrate.

Yet another object of the present invention is to provide a sandwich construction including a method for fabricating a sandwich structure including an apertured substrate and a sheet material joined to a side of the substrate.

A further object of the present invention is to provide an electrostatic method for applying a fiber-like length of an adhesive substance in a jackstraw fashion to the side of a honeycomb substrate.

Yet another object of the present invention is to provide an electrostatic method for applying fiber-like lengths of an adhesive substance to the side of a honeycomb substrate which minimizes the deposition of the adhesive substance upon the side wall surfaces of the cells of the substrate.

A further object of the present invention is to provide a method for fabricating a sandwich structure in which a joining substance is substantially confined to the areas of contact between the abutting components of the sandwich structure and to areas substantially immediately adjacent thereto.

With the aforementioned objects enumerated, other objects will be apparent from reading the following description and the appended claims.

In the drawing:

FIG. 2 is a perspective view of a honeycomb substrate after fiber-like lengths of an adhesive substance have been deposited upon the side of the substrate;

FIG. 3 is a side view of a cell of the honeycomb substrate of FIG. 2 illustrating the accumulation of fiber-like lengths of the adhesive substance on the edges of and over the opening of the cell of the honeycomb substrate;

FIG. 4 is a perspective view of the adhesive substance accumulated along the edges and areas substantially immediately adjacent thereto of one cell of the honeycomb structure; and FIG. 5 is a cross sectional view of a joint between the side of the substrate and a sheet material.

Figure 1:
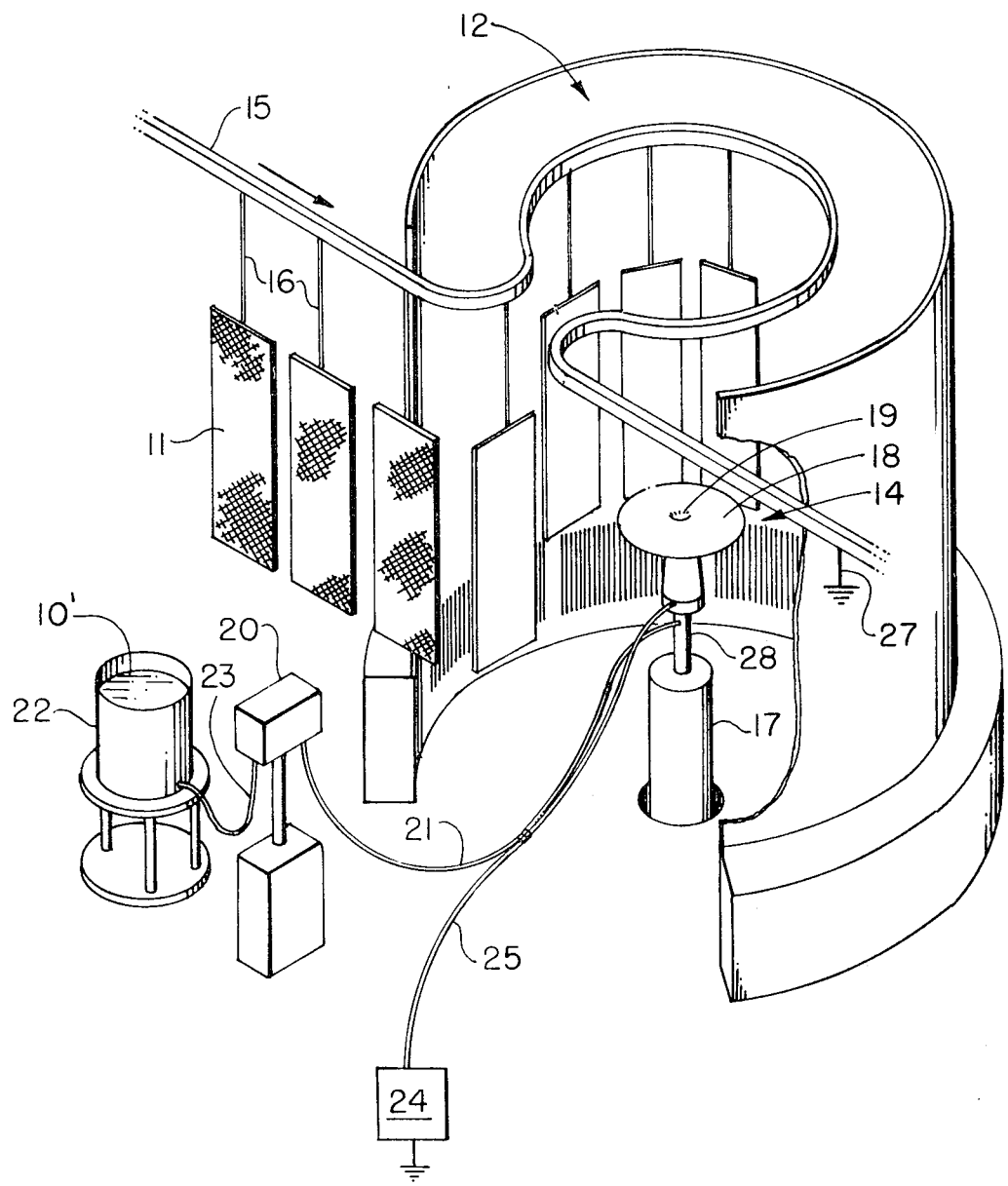
FIG. 1 is a perspective view of an apparatus including means for applying electrically charged fiber-like lengths of the adhesive substance to a side of a honeycomb substrate.

Generally speaking, the present invention relates to a method for applying an adhesive substance to a side of an apertured substrate and to a method for fabricating a sandwich structure from the apertured substrate carrying the adhesive substance. One method for applying the adhesive substance to the apertured substrate includes the steps of forming the adhesive substance into electrically charged fiber-like lengths and depositing the lengths upon a side of the substrate in a jackstraw fashion. One method for fabricating the sandwich structure includes the steps of heating the deposited fiber-like lengths of adhesive substance so that the lengths melt and withdraw by surface tension to provide a substantially continuous mass of adhesive on the edges of the apertures and on the areas substantially immediately adjacent the apertures and bringing a sheet material contiguous to the side of the substrate carrying the mass of adhesive to thereby provide an adhesive joint between the substrate and the sheet material. The present invention also relates to a sandwich structure made using this method.

Referring now to FIG. 1 of the drawing, one of several different types of electrostatic apparatus for forming and applying fiber-like lengths (not shown) of a suitable structural adhesive to an apertured substrate, such as a honeycomb substrate 11, is indicated by the reference numeral 12. The apparatus 12 includes an electrostatic device 14 for forming and propelling electrically charged lengths of a structural adhesive toward substrates 11.

The electrostatic device 14 may be mounted for vertical reciprocation on a hydraulically driven support generally designated at 17 by means of an insulating member 28. The upper end of the electrostatic device includes a suitable rotatable member 18 for forming and dispensing charged, thread-like lengths of the suitable adhesive substance. The rotatable member 18 may be in the form of a disc, a bell or the like having a central opening 19. The rotatable member 18 illustrated in FIG. 1 is a disc. The opening 19 at the center of the rotatable member 18 is connected to a pump 20 through a suitable conduit means such as hose 21. The pump 20 is connected to reservoir 22 by a suitable conduit means such as hose 23. The pump 20 may be suitably activated so as to draw a suitable liquid adhesive substance 10' from the reservoir 22 and deliver the liquid adhesive substance 10' to surface 18 of the rotatable member via hose 23, hose 21 and opening 19 in the rotatable member.

A suitable direct current power supply 24 is connected to the rotatable member 18 by a suitable high voltage cable such as cable 25. The power supply 24 maintains the rotatable member 18 at a high electrical potential relative to electrical ground. The direct current power supply 24 is capable of supplying up to about 90,000 volts direct current to the rotatable means 18.

The nature and degree of fineness of the fiber-like lengths of a particular adhesive substance may be varied by, among other things, changing the speed of rotation of the electrically charged rotatable member 18. For example, as the speed of rotation of a rotatable member 18 having a fifteen inch diameter is increased to about 3600 r.p.m. or higher, the liquid structural adhesive substance delivered to the disc edge first tends to be dispensed from the edge of the rotatable member as slugs of adhesive at about 100 r.p.m. and then as fibers of increasing fineness as the speed of rotation is increased to 3600 r.p.m. Slugs of adhesive do not appear to provide the desired results. In order to provide suitably fine fiber-like lengths of adhesive substance, the speed of rotation of the rotatable member should be above 400 r.p.m. The preferred speed of rotation of rotatable member 18 having a diameter of about 4 to about 36 inches is from about 400 to about 3000 r.p.m. Reducing the speed of rotation of the rotatable member to less than about 100 r.p.m. results in the formation of slugs of the adhesive substance. It is thought that operating the apparatus with a rotatable member having a 15 inch diameter disc spaced about twelve to about fifteen inches from the substrates 11 at a voltage of about 90,000 volts direct current at a speed of about 900 r.p.m. and forms the liquid 10' into suitable fiber-like lengths and suitably causes the fiber-like lengths to be deposited upon the substrate 11 in a jackstraw fashion.

The rheology of the liquid adhesive appears to determine to some degree whether or not the adhesive tends to slug or form fibers. Liquid adhesives having a viscosity of about 15 to about 50 seconds in a No. 2 Zahn Cup appear to function satisfactorily. A liquid adhesive having a viscosity of about 25 to about 35 seconds in a No. 2 Zahn Cup appears to function most satisfactorily. Since the adhesive on the rotatable member is subjected to a relatively high shear force, simple viscosity relationships do not appear to be sufficient to determine whether the adhesive material will form the desired thread-like lengths. It is thought that the adhesive material should be such as described by the terms "tacky" or "stringy" if it is to provide the desired thread-like lengths. It does not appear to be possible to accurately define this characteristic of the adhesive material; however, the ability of the adhesive to be formed into thread-like lengths appears to be related in some way to its viscosity and its elasticity. In a general sense, the liquid adhesive should display visco-elastic properties. Such adhesive materials, when subjected to the combination of the electrical forces of the applied potential and the centrifugal forces of the rotating member, should depart the disc edge as extended thread-like lengths or filaments. This property is displayed by most phenolic, epoxy, rubber and the like adhesives.

The electrical resistivity of the liquid should be such as to allow the adhesive fibers to be electrostatically charged. Liquid adhesives having a specific resistance of about $5 \times 10^6$ to $2 \times 10^8$ ohm-centimeters appear to be satisfactory.

A suitable conveyor 15 is provided with movable conductive hook means 16 for carrying and transporting a plurality of the apertured substrates 11 (shown in FIG. 1 as flat plane members) in an arcuate path around the electrostatic device 14. The conveyor 15 and the hook means 16 are electrically grounded as at 27. It is seen that apertured substrate 11 is grounded by virtue of being connected to ground through hook means 16 and conveyor 15.

It should be noted that the substrates 11 are transported by the conveyor 15 in an arcuate path (exceeding a semicircle) around the electrostatic device 14. The substrates 11 are spaced radially outwardly from the rotatable member 18 of the electrostatic device 14 intersecting its plane of rotation, therefore, the electrostatic force existing between the device 14 and the grounded substrates 11 and any centrifugal force exerted on the liquid adhesive substance 10' as it moves out on the upper surface of the rotatable member 18 tends to form the liquid adhesive 10' into charged fiber-like lengths which are dispensed toward substrates 11. The fiber-like lengths are collected in jackstraw fashion on the surface of the substrate by the electrical forces exerted by the applied voltage. Reciprocation of the device 14 should distribute the fiber-like lengths over the exposed length of the substrate 11. At about the midpoint of the movement of substrates 11 around the rotatable member 18 of the electrostatic device 14, the substrates may be indexed 180 degrees about an axis determined by hook means 16 so that both major sides of the substrate are presented to the action of the rotatable member 18 and can be coated thereby.

For purposes of illustration and not for purposes of limitation, FIG. 1 of the drawings illustrates the use of a disc electrostatic device 14. It is to be understood that a bell electrostatic device (not shown) may be substituted for the disc. The bell is mounted so that it can be rotated about its central axis. The forward edge of the bell is sharpened and spaced from the substrate 11 by a distance of about 12 to about 15 inches. The axis of the bell is substantially perpendicular to the side of the substrate closest thereto. The rotation of the bell must be sufficiently fast to counteract the forces of gravity and to form the liquid adhesive substance 10' into a thin, substantially uniform film from which the charged, fiber-like lengths are provided. The speed of rotation of the bell is comparable to the speed of rotation of the disc. The bell electrostatic device may be mounted on a suitable reciprocator (not shown) so as to displace it over the side of the substrate as it moves by.

The liquid adhesive substance 10' used to provide the fiber-like lengths may be any suitable structural adhesive such as a thermosetting resin, a thermoplastic resin, an elastomeric material, admixtures thereof and the like. Suitable thermosetting resins may be epoxies, phenolics, admixtures thereof and the like. Suitable thermoplastic resins may be vinyls, polyamides, polyethylene, admixtures thereof and the like. Suitable elastomeric materials may be neoprenes, nitriles, polysulfides, admixtures thereof and the like. Of the named adhesive substances, the thermosetting resins appear to provide the most satisfactory results. Admixtures of the resins and/or elastomeric materials may enhance the mechanical and the physical properties of the adhesive substance. Suitable admixtures may be epoxy-phenolic resins, epoxy-polyamide resins, epoxy-polysulfide resins, epoxysilicones, phenolic-neoprenes, phenolic-nitriles, phenolic-vinyls, polyurethanes and the like.

Prior to depositing the fiber-like lengths of adhesive substance upon the substrates 11, the substrate may be pretreated so as to remove contaminates from the surfaces thereof which may deleteriously affect joining of the fiber-like adhesive to an edge 11' of the apertured substrate. The apertured substrate 11 may be cleaned by solvent wiping, bath immersion and the like. Chemicals which may be empolyed to clean the edges of the substrate include acetone, isopropyl alcohol, xylene, toluene and the like. Trichloroethylene may be used to degrease the apertured substrate 11; however, care should be taken to remove residual traces of the solvent as trichloroethylene tends to inhibit the cure of most structural adhesives.

For purposes of illustration and not for purposes of limitation, a hexagonal honeycomb substrate 11 is illustrated in several figures of the drawing. It should be recognized, however, that any suitable apertured substrate may be substituted for the honeycomb substrate 11 such as a corrugated substrate, a substrate having a plurality of circular, rectangular, square, pentagon cells and the like. However, a substrate having a plurality of hexagonal honeycomb cells may be the preferred embodiment of the apertured substrate because of its availability and high strength-to-weight ratio.

Whereas, for the purposes of illustration an electrostatic device is shown as a means for forming and depositing the fibered adhesive layer on the substrate, it is to be understood that any other suitable devices, such as an air spray device, may be used to form and impinge the fibers on the substrate surface without departing from the spirit of the invention.

In situations where weight is a consideration, the honeycomb substrate may be fabricated from any suitable lightweight material such as aluminum, beryllium, magnesium, titanium, alloys and composites thereof and the like and allows such as stainless steel and the like. Of the several metallic materials aluminum, beryllium, alloys and composites thereof are preferred with aluminum being the most preferred metallic material.

The metallic material used to fabricate the honeycomb substrate 11 may be a foil material as thin as 1 mil. Generally, the foil material used in the honeycomb substrate is about 1 mil to about 10 mils or more thick. A foil material having a thickness of about 4 to about 10 mils is preferred for a honeycomb substrate. The individual cell size of the honeycomb substrate may be 1/8, 3/16, 1/4, 3/8, 1/2 or an inch and larger. The individual cells of the honeycomb substrate may be a regular hexagon or an irregular hexagon. If the cells of the honeycomb substrate are irregular hexagons, the cells may be about 3/16 inch across the width of the cell and about 1/2 inch across the length of the cell. The depth of the honeycomb cell may vary considerably. For example, the honeycomb cell depth may be from about 1/4 inch to about 4 inches or more.

The apertured substrate may also be fabricated from non-metallic materials such as glass, wood, plastic, foam materials such as polyurethane and polystyrene, wallboard and the like.

The following example is illustrative of a technique for electrostatically depositing fiber-like lengths of the adhesive substance upon the side of a honeycomb substrate. The "side" of the substrate as used in this disclosure is used to include the edged extremities of the individual cells which form the apertured substrate.

EXAMPLE

An aluminum honeycomb substrate having a cell size of about 3/16 inch by about 1/2 inch and about 3/4 inch deep is electrically grounded and suspended from a conveyor by a conductive hook. The substrate is held by the hook in the vertical position. An electrostatic device including a rotatable member capable of forming and dispensing electrically charged fiber-like lengths of an adhesive substance is connected to a high voltage direct current source capable of supplying a negative voltage of about 90 kv. (kilovolts) to the device. The edge of the rotatable member is spaced about 12 to about 15 inches from the horizontal side of the honeycomb substrate. The axis of the rotatable member is substantially parallel to the side of the honeycomb substrate. A suitable liquid epoxy resin having a viscosity of about 30 seconds in a No. 2 Zahn Cup at about 78° F. and a specific resistance of about $2 \times 10^8$ ohms-centimeters is fed to the rotatable member of the electrostatic device at a delivery rate of about 200 cc. per minute. The rotatable member 18 is about 15 inches in diameter and is rotating at a speed of about 900 r.p.m. Charged fiber-like lengths of the epoxy resin are formed at the edge of the rotating member and are dispensed toward the honeycomb substrate. Moving the honeycomb core at a rate of about 1 to 3 inches per second past the rotatable member of the device appears to result in a substantially uniform deposit of the fiber-like lengths of epoxy resin on the side of the honeycomb substrate of a sufficient depth for the purposes of the present invention.

The fiber-like lengths of adhesive substance because of their charge tend to be electrostatically deposited on the side of the honeycomb substrate in a jackstraw fashion as is illustrated in FIG. 2. The lengths are deposited on the edged extremities 11' of the individual cells of the substrate as well as over the openings of the individual cells of the substrate. The jackstraw deposit of fiber-like lengths covering the opening of a honeycomb cell of the substrate is also illustrated in FIG. 3 of the drawing.

After forming the fiber-like lengths and depositing the fiber-like lengths of adhesive substance upon the side of the honeycomb substrate 11, the adhesive may be heated to a temperature at or just above the melting point of the material so as to cause the adhesive to assume a sufficiently fluid state having such surface tension whereby it can flow to form an adherent, substantially continuous mass 26 on and substantially immediately adjacent to edge 11' of substrate 11 as shown in FIG. 4. Heating the fiber-like lengths to a temperature of about 250° F. or higher appears sufficient to cause mass 26 of adhesive substance to be formed from the fiber-like length. The heating of the adhesive may be accomplished with a stream of hot air directed through and over the accumulated web of adhesive fibers. It is thought that air flowing through the honeycomb cells at a rate of about several feet per second tends to facilitate the accumulation of the adhesive substance as mass 26 about the edged extremities of the individual cells of the honeycomb substrate. Although the accumulated adhesive on the substrate edge is shown in FIG. 4 to be continuous, it is to be understood that an accumulation of adhesive which is somewhat less than continuous may serve the purpose of the invention. Greatest structural strength of the composite is obtained with continuous accumulation, but adequate strength for some applications may be obtained with discontinuous accumulations.

After the substrate edges are coated with the adhesive, the substrate can be handled or stored without apparent difficulty until desired to be used to form a composite structure.

Generally, structural adhesives such as thermosetting resins like epoxy resin require heat and pressure to crosslink the adhesive so as to provide a joint of adequate strength between the adjacent layers of the sandwich structure. The temperature to which the adhesive is subjected is generally about 300° to about 350° F. for a few seconds to 4 hours or more. The pressure to which the layers to be joined together are subjected should be uniform and constant. The pressure to which the joint is subjected during fabrication may range from contact pressure to about 100 p.s.i. or more. Most commercially available structural adhesives cure at a temperature of about 330° to about 350° F. which curing temperature is applied for about 30 to 120 minutes. The pressure applied to the bond joint for most commercially available adhesives is of about 25 to about 100 p.s.i. It should be noted that the time interval for heating and the application of pressure may vary proportionally with temperature. For example, heating the structural adhesive to a temperature of about 600° F. may require about 3 seconds to provide a satisfactory bond joint while heating the same structural adhesive to a temperature of about 250° F. may require about 4 hours to provide a satisfactory bond joint. It should be recognized that the curing temperature and pressure used are determined by the nature of the adhesive material used.

FIG. 5 illustrates a honeycomb substrate 11 faced with a suitable sheet material 30 and 31. The honeycomb substrate 11 may be a metallic material such as aluminum. The wall thickness of the honeycomb substrate may be about 10 mils. The sheet material 30 and 31 may be a metallic material such as aluminum having a thickness of about 20 mils to about 750 mils. The aluminum sheet may be joined to the edges of the honeycomb substrate 11 by any suitable structural adhesive such as epoxy resin applied to the edges 11' of the substrate using the electrostatic deposition techniques outlined hereinbefore. Note that the adhesive substance does not extend completely across the area between adjacent side walls of the honeycomb cells. Also note that the adhesive substance exhibits a positive meniscus indicating wetting of the surfaces of the joined materials.

The sheet material 30 or 31 or both may be fabricated from a non-metallic material such as glass, wood, plastic foams such as polyurethane and polystyrene, wall board and the like.

Another embodiment of the invention contemplates the formation of the adhesive into a filamentous sheet including thread-like lengths upon a collection means in a suitable manner such as by using the electrostatic equipment described above. The filamentous sheet of thread-like lengths is removed from the collection means and may be placed upon the side of the apertured substrate. The filamentous sheet may be heated to provide the edge accumulation of adhesive described above. The sheet material used to face the substrate may be applied to the substrate using adequate pressure to effect joining of the sheet material to the substrate.

It should be appreciated that the present invention is applicable to the deposition of thread-like lengths of adhesive to either planar (flat) or non-planar (contoured) surfaces. Heating the thread-like lengths to provide the desired adhesive flow to the edged extremities which cooperate to form the side of the apertured substrate appears to be applicable both to a planar and to a non-planar surface. Of course, the sheet material contemplated to be joined to the apertured substrate should have substantially the same contour as the side of the substrate surface to which it is to be joined if it is desired to provide a joint therebetween of maximum strength. It is seen that the invention is applicable to the formation of non-planar (contoured) composites such as air foil sections as well as the planar (flat) composites such as panel sections.

The present invention is not intended to be limited by the disclosure therein, changes and modifications may be made by those skilled in the art without departing from the spirit and scope of the present invention. Such modifications are considered to be within the purview and scope of the present invention and the appended claims.

I claim:

1. In a method for providing a side of an apertured substrate with an adhesive substance which involves applying the adhesive to the apertured substrate and causing the adhesive to collect over the edges around the apertures of the apertured substrate, the improvement which comprises prior to applying the adhesive to the apertured substrate, forming the adhesive substance from a source of the adhesive substance into fiber-like lengths, propelling the fiber-like lengths toward the apertured substrate, and depositing the fiber-like lengths of adhesive upon the apertured substrate in a jackstraw fashion.

2. In a method for providing a side of an apertured substrate with an adhesive substance as claimed in claim 1, further including the steps of charging the fiber-like lengths electrically and providing the substrate with a charge different from the charge carried by the fiber-like lengths of adhesive, the fiber-like lengths of adhesive being applied to the apertured substrate in a jackstraw fashion.

3. In the method for providing a side of an apertured substrate with an adhesive substance as claimed in claim 1, further including the step of passing the substrate by the source of the fiber-like lengths of adhesive substance, the fiber-like lengths being deposited on the side of the substrate to a desired depth.

4. In the method for providing a side of an apertured substrate with an adhesive substance as claimed in claim 3, wherein the substrate follows a substantially arcuate path about the source of the fiber-like lengths of adhesive substance.

5. In the method for providing a side of an apertured substrate with an adhesive substance as claimed in claim 1, wherein the apertured substrate is a honeycomb substrate.

6. In a method for fabricating a sandwich structure which includes the step of joining a sheet material to an apertured substrate using an adhesive substance carried by the edged extremities of the apertures forming the side of the apertured substrate, the improvement which comprises prior to joining the sheet material to the substrate, providing a filamentous layer of the adhesive substance in contact with the edged extremities of the apertured substrate and across the openings of the apertures, and accumulating the adhesive substance upon the edged extremities of the apertures of the substrate by heating the filamentous layer of adhesive substance.

7. In a method for fabricating a sandwich structure including an apertured substrate joined to a sheet material by an adhesive substance on the edges of the apertured substrate, the improvement which comprises forming the adhesive into electrically charged fiber-like lengths which are propelled toward the substrate, the substrate carrying a charge different from the charge carried by the fiber-like lengths of adhesive, the lengths of adhesive being attracted toward the apertured substrate, applying the lengths of adhesive in a jackstraw fashion over the apertures and the edges adjacent the apertures of the substrate, and providing a substantially continuous mass of adhesive on the edges of the apertures and on the areas substantially immediately adjacent the apertures of the substrate by heating the lengths of adhesive to a temperature adequate to cause the lengths to have such a surface tension so as to provide said substantially continuous mass of adhesive.

8. In the method for fabricating a sandwich structure as claimed in claim 7, wherein the heating of the lengths of the adhesive is carried out at a temperature of about 200° F. or higher.

9. In the method for fabricating the sandwich structure of claim 7, further including the step of providing a facing material contiguous to the edge of the substrate having the substantially continuous mass of adhesive substance, the adhesive providing a joint between the facing material and the edge of the substrate.

10. In the method for fabricating the sandwich structure of claim 9, further including the steps of applying heat and pressure to the contiguous facing material and substrate.

11. In the method for providing a side of an apertured substrate with an adhesive substance as claimed in claim 1, wherein the adhesive is formed into electrically charged fiber-like lengths by the steps of supplying the adhesive to the surface of a rotating member and applying an electrical potential to the rotating member, the centrifugal force of the rotating member and the electrical force of the applied potential forming the adhesive into charged fiber-like lengths.

References Cited

UNITED STATES PATENTS

| | | | |
|---|---|---|---|
| 2,776,223 | 1/1957 | Brown et al. | 117—93.4 |
| 2,786,006 | 3/1957 | Ferverda | 156—283 |
| 2,952,579 | 9/1960 | Merriman | 156—197 |
| 3,106,503 | 10/1963 | Randall et al. | 156—292 X |
| 3,113,037 | 12/1963 | Tamotsu Watanbe | 117—93.4 |
| 3,137,604 | 6/1964 | Bosch | 156—292 X |
| 3,134,705 | 5/1964 | Moeller | 156—197 |

CARL D. QUARFORTH, Primary Examiner

E. E. LEHMANN, Assistant Examiner

U.S. Cl. X.R.

117—93.4, 16; 156—283, 320; 161—68

UNITED STATES PATENT OFFICE
CERTIFICATE OF CORRECTION

Patent No. 3,649,408        Dated March 14, 1972

Inventor(s) Emery P. Miller

It is certified that error appears in the above-identified patent and that said Letters Patent are hereby corrected as shown below:

Column 1, line 52, after "sandwich" should read -- structure --. Column 3, line 33, "aperture" should read -- apertured --; line 36, "aperture" should read -- apertured -- Column 7, line 7, "allows" should read -- alloys --. Column 8, line 12, "length" should read -- lengths --.

Signed and sealed this 7th day of November 1972.

(SEAL)
Attest:

EDWARD M.FLETCHER,JR.
Attesting Officer

ROBERT GOTTSCHALK
Commissioner of Patents